United States Patent [19]
Kimura et al.

[11] Patent Number: 5,484,216
[45] Date of Patent: Jan. 16, 1996

[54] SUPPORTING DEVICE FOR A VIBRATION DRIVEN ACTUATOR

[75] Inventors: Atsushi Kimura; Yoshifumi Nishimoto; Hideki Tanaka, all of Yokohama; Hiroyuki Seki, Urawa; Toshiaki Harada, Kawasaki; Yoshitaka Okamura, Machida; Shinji Yamamoto, Tokyo, all of Japan

[73] Assignee: Canon Kabushiki Kaisha, Tokyo, Japan

[21] Appl. No.: 158,779

[22] Filed: Dec. 1, 1995

[30] Foreign Application Priority Data

Dec. 3, 1992 [JP] Japan ................................ 4-324235

[51] Int. Cl.⁶ .................................................. B41J 19/00
[52] U.S. Cl. ........................ 400/319; 400/322; 310/345
[58] Field of Search ................................... 400/279, 319, 400/320, 322, 323; 310/323, 328, 345

[56] References Cited

U.S. PATENT DOCUMENTS

| | | | |
|---|---|---|---|
| 4,672,256 | 6/1987 | Okuno et al. ............................ | 310/323 |
| 4,692,650 | 9/1987 | Okumura et al. ....................... | 310/323 |
| 4,692,651 | 9/1987 | Hiramatsu et al. ..................... | 310/323 |
| 5,128,580 | 7/1992 | Maeno et al. ........................... | 310/323 |
| 5,140,214 | 8/1992 | Kimura et al. .......................... | 310/323 |
| 5,155,407 | 10/1992 | Kimura et al. .......................... | 310/323 |
| 5,176,376 | 1/1993 | Igaki et al. .............................. | 310/323 |
| 5,180,941 | 1/1993 | Seki et al. ............................... | 310/323 |
| 5,192,890 | 3/1993 | Kimura et al. .......................... | 310/323 |
| 5,233,258 | 8/1993 | Myoga et al. ........................... | 310/323 |
| 5,241,234 | 8/1993 | Seki et al. ............................... | 310/323 |

FOREIGN PATENT DOCUMENTS

| | | |
|---|---|---|
| 0435496A1 | 7/1991 | European Pat. Off. . |
| 0450919A1 | 10/1991 | European Pat. Off. . |
| 0475752A2 | 3/1992 | European Pat. Off. . |
| 3-31137 | 2/1991 | Japan . |
| 4-21374 | 1/1992 | Japan . |

*Primary Examiner*—Edgar S. Burr
*Assistant Examiner*—John S. Hilten
*Attorney, Agent, or Firm*—Fitzpatrick, Cella, Harper & Scinto

[57] ABSTRACT

A planar auxiliary supporting member for supporting an elastic member for generating a vibration is arranged. The elastic member contacts a rail-shaped stationary member, and moves along the stationary member. The rigidity of the supporting member is set to be low, so that the elastic member as a stator stably moves along the stationary member.

7 Claims, 6 Drawing Sheets

5,484,216

SUPPORTING DEVICE FOR A VIBRATION DRIVEN ACTUATOR

BACKGROUND OF THE INVENTION

1. Field of the Invention

The present invention relates to a vibration wave motor and, more particularly, to a vibration wave motor wherein an elastic member in which a travelling wave is generated is urged against a rail-like stationary member, and is moved along the rail-like stationary member, and to a printer using the vibration wave motor.

2. Description of the Related Art

A conventional vibration wave motor of this type is proposed in U.S. Pat. No. 5,192,890. FIGS. 11 and 12 show the motor.

An elastic member 1 consists of a metal material, and has a projection 1a formed on the sliding surface side. When an AC voltage is applied to a piezoelectric element 2 joined to the upper surface of the elastic member 1, a travelling vibration wave is generated in the elastic member 1. Since the generation principle of the travelling vibration wave and the structure of the piezoelectric element 2 are known to those who are skilled in the art, a detailed description thereof will be omitted. Generally, the travelling vibration wave is formed when AC voltages having a temporal phase difference of 90° are applied to two groups of driving piezoelectric elements which are positionally shifted by 90° of the piezoelectric element. A rail-shaped stationary member 8 frictionally contacts the elastic member 1, and is fixed to a bottom plate 10 of a motor case. More specifically, the elastic member 1 is biased to contact the stationary member 81 via a vibration insulating member 6 (e.g., felt) and a compression spring 3.

A planar auxiliary supporting member 7 has an H shape when it is viewed from the top (see, e.g., FIG. 12), and is joined to the bottom portion of a slit of the elastic member 1. The supporting member 7 firmly supports the central portion of the elastic member 1 to a table 4. Thus, the elastic member 1 can make a smooth linear motion together with the table 4 without cluttering.

This motor is used for driving a printing head in, e.g., a bubble-jet printer. The printing head is mounted on a carriage (not shown) attached to the table 4, and the motor linearly and reciprocally moves the printing head.

However, it is very difficult to accurately bring the elastic member 1 into surface-contact with the rail-shaped stationary member 8 due to dimensional errors of parts, and the like. In practice, as shown in FIGS. 13 and 14, the elastic member 1 may contact the stationary member 8 at an oblique angle. For this reason, the contact state between the elastic member 1 and the rail-shaped stationary member 8 becomes line contact and unstable. When the contact state changes in the moving direction of the elastic member 1, it is difficult to stably move the elastic member 1.

Such problems of the vibration wave motor impair print precision of the printer.

SUMMARY OF THE INVENTION

It is an object of the present invention to provide a vibration wave motor which can stably move an elastic member.

It is another object of the present invention to provide a printer apparatus which can realize high-precision printing.

Other objects of the present invention will become apparent from the following detailed description of the present invention.

In one aspect, a planar auxiliary supporting member for supporting an elastic member for generating a vibration is arranged. The elastic member contacts a rail-shaped stationary member, and moves along the stationary member. The rigidity of the supporting member is set to be low, so that the elastic member as a stator stably moves along the stationary member.

DESCRIPTION OF THE PREFERRED EMBODIMENTS

Figure 1:
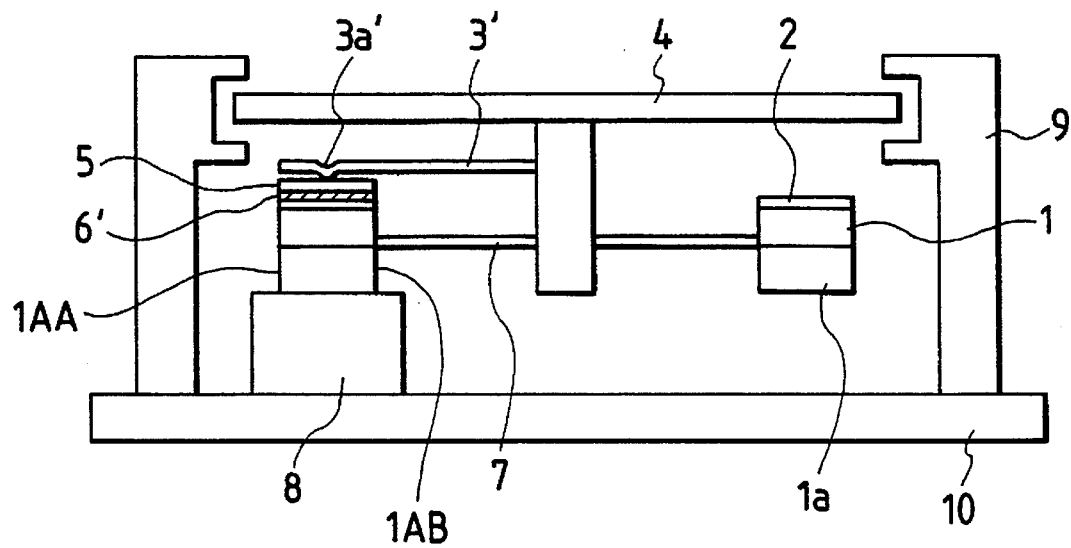
FIG. 1 is a side view showing the first embodiment of the present invention.

The present invention will be described in detail hereinafter with reference to illustrated embodiments. The same reference numerals denote the same parts as in the prior art, and a detailed description thereof will be omitted. Since a method of generating a travelling wave in a track type vibration member is known to those who are skilled in the art, a description thereof will be omitted as well.

FIG. 1 shows the first embodiment of the present invention.

Figure 12:
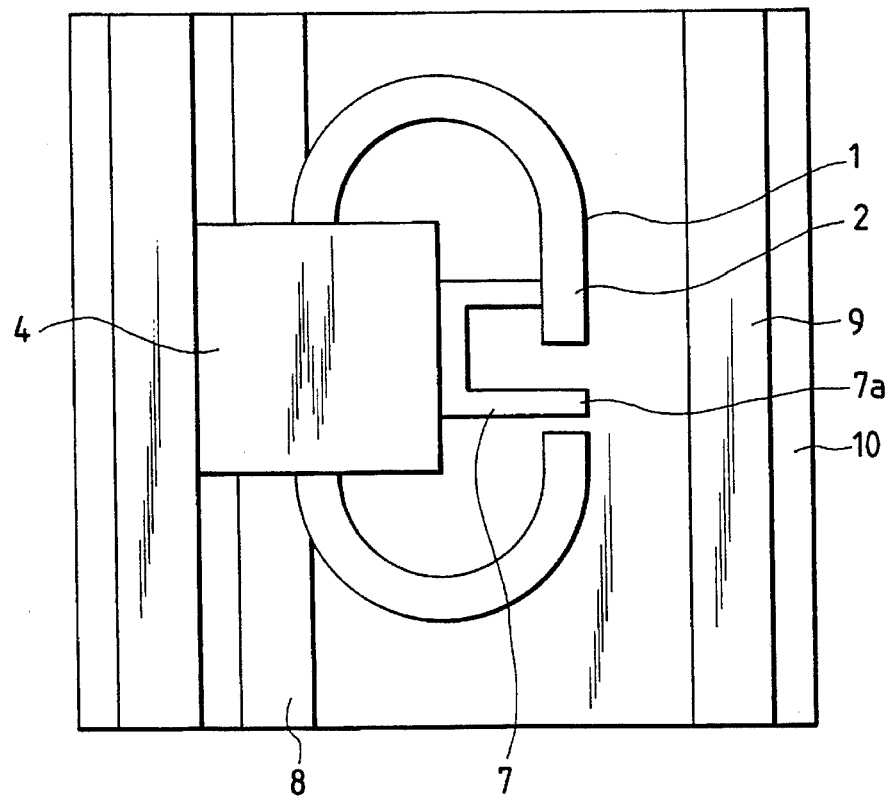
FIG. 12 is a plan view of FIG. 11.
Figure 13:
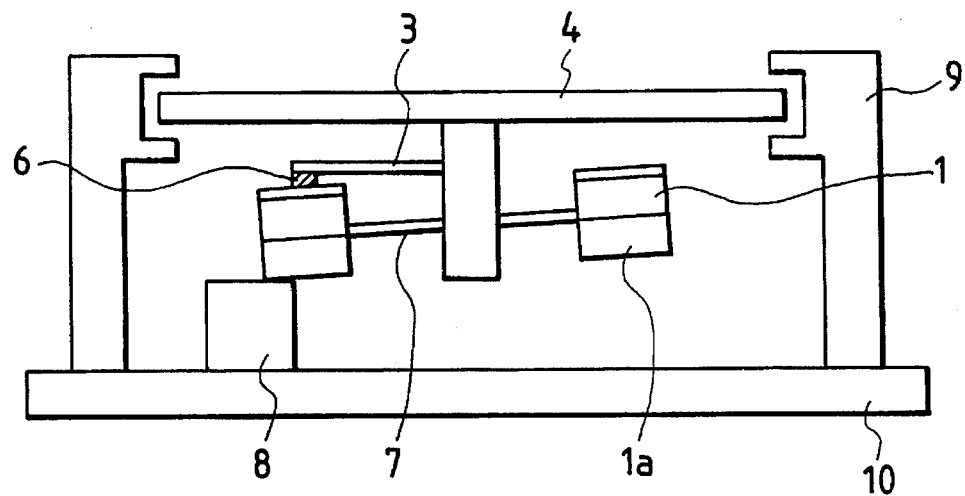
FIG. 13 is a side view showing the use state of the vibration wave motor shown in FIG. 11.
Figure 14:
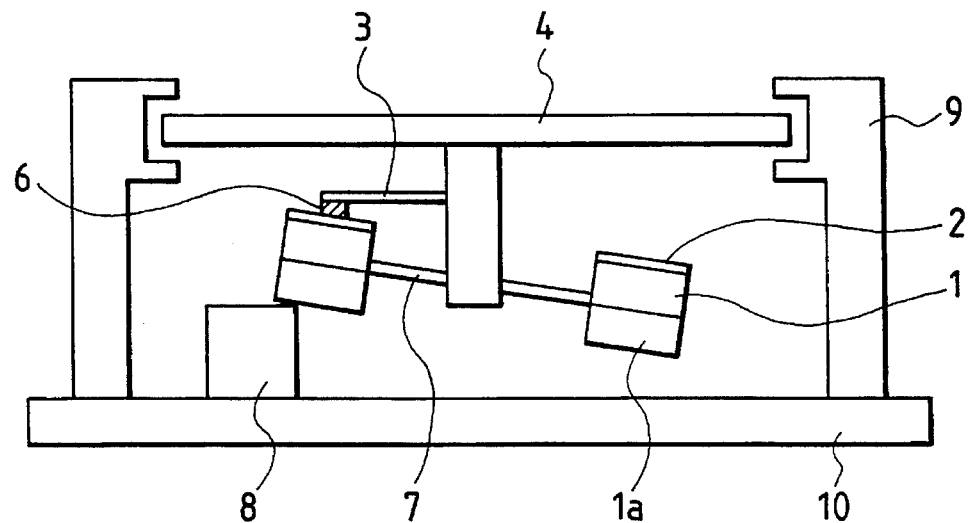
FIG. 14 is a side view showing the use state of the vibration wave motor shown in FIG. 11.

In this embodiment, an elastic member 1 has an elliptical shape, as shown in FIG. 12, and has a plurality of projections defined by a plurality of grooves on a portion contacting a rail-shaped stationary member 8. The entire width, from an outer circumferential portion 1AA to an inner circumferential portion 1AB, of a single straight portion of the elastic member 1 contacts the rail-shaped stationary member 8. Furthermore, in order to uniformly distribute compression between the stationary member 8 and the elastic member 1, a compression plate 5 is arranged between a felt 6' and a compression spring 3', and a projection 3'a of the compression spring 3' is formed at a position where the compression force acts on the central portion, in the widthwise direction, of the compression plate 5.

Note that the projection 3'a is formed by bending a portion of the spring 3'.

Figure 2:
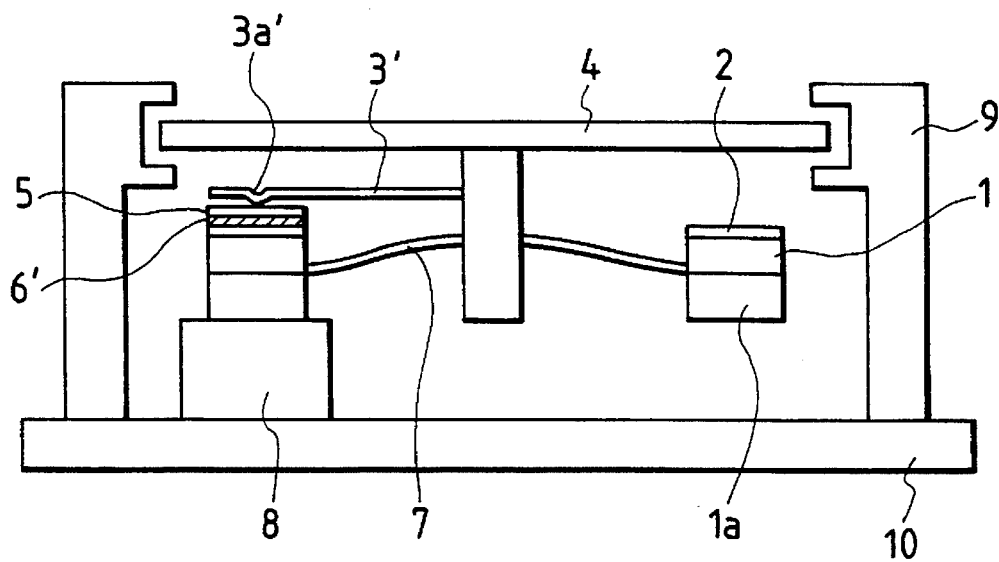
FIG. 2 is a side view showing the use state of FIG. 1.

Note that FIG. 1 illustrates a case wherein the respective parts have ideal dimensional precision. For example, when the dimensional precision is low, and the position of the elastic member 1 is shifted upward in FIG. 1, a planar auxiliary supporting member 7 flexes, as shown in FIG. 2. At this time, when the counterforce of the supporting member 7 is set to be equal to or lower than half a compression force of the compression spring 3', almost the entire contact surface of the elastic member 1 contacts the contact surface of the rail-shaped stationary member 8, and the posture of the elastic member 1 follows the frictional surface of the rail-shaped stationary member 8. Therefore, the counterforce of the planar auxiliary support member 7 influences the compression distribution unless its rigidity is set to be considerably lower than that of the compression spring 3'.

Figure 3:
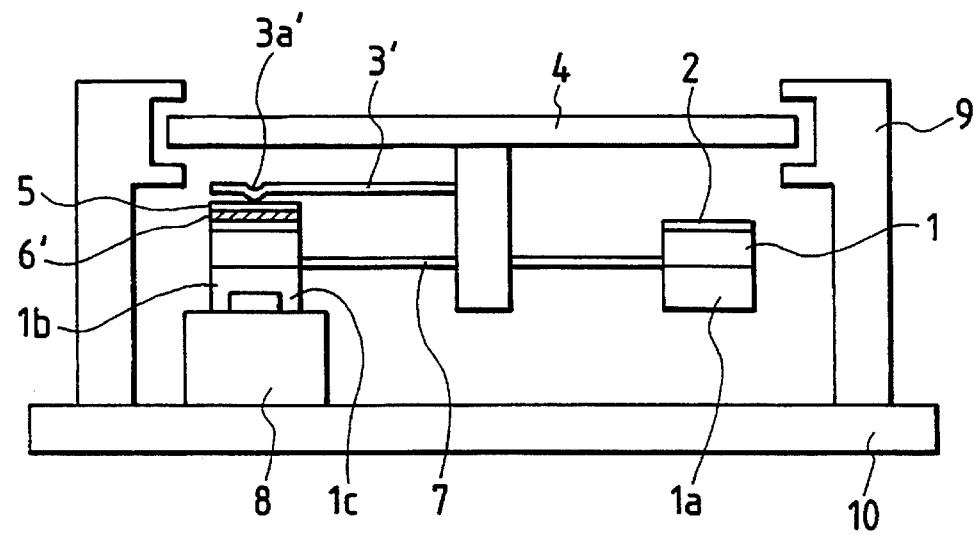
FIG. 3 is a side view showing the second embodiment.

FIG. 3 shows a second embodiment of the present invention. In this embodiment, two portions, i.e., an outer peripheral portion 1b and an inner peripheral portion 1c of a single straight portion of the elastic member 1 contact the rail-shaped stationary member, so that the posture of the elastic member 1 follows the frictional surface of the rail-shaped stationary member 8. The two contact portions need only be separated by a certain distance, and need not always be located at the outermost and innermost peripheral positions.

Figure 4:
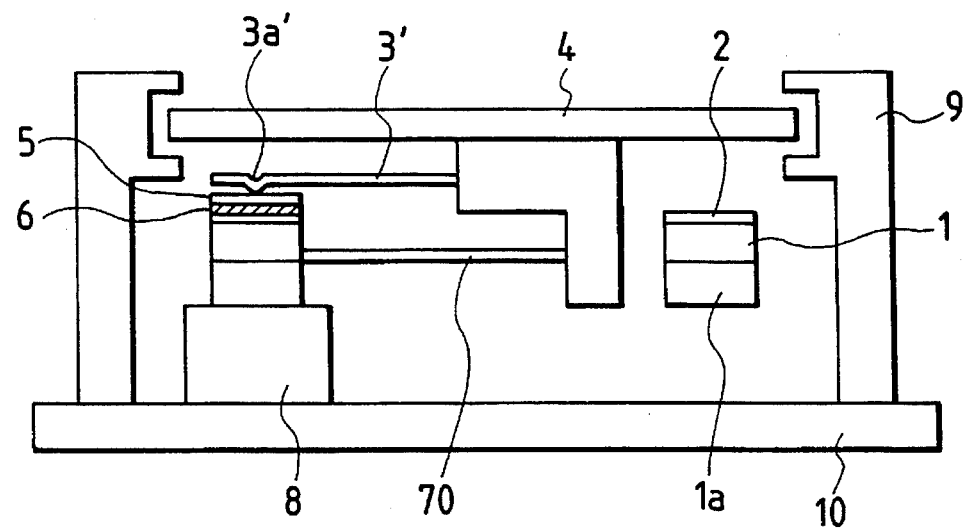
FIG. 4 is a side view showing the third embodiment.
Figure 5:
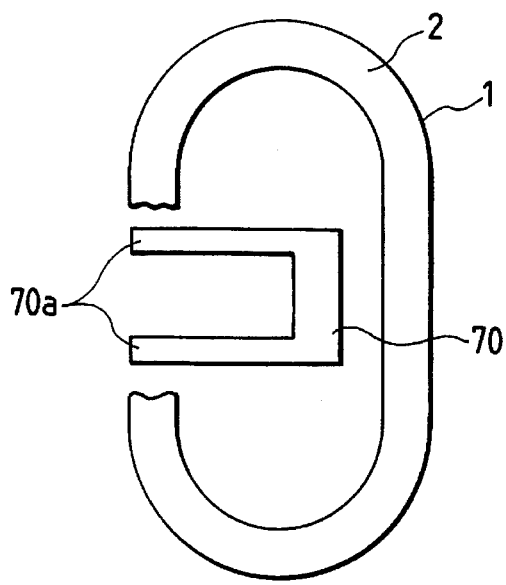
FIG. 5 is a plan view showing principal parts of FIG. 4.

FIGS. 4 and 5 show a third embodiment of the present invention. In this embodiment, a planar auxiliary supporting member 70 is joined to only one straight portion of the elastic member 1. Thus, the planar auxiliary supporting member 70 has considerably lower rigidity than that in the first and second embodiments, and does not adversely influence the compression distribution.

In this embodiment, a distal end portion 70a (see FIG. 5) of the planar auxiliary supporting member 70 is joined to the bottom portion of the slit of the elastic member 1. The position of the joint portion is desirably set at or near the middle point between adjacent antinode and node of two standing waves (wavelength $\lambda$) which are shifted from each other by $\lambda/4$, as described in Japanese Laid-Open Patent Application No. 4-21374.

Figure 6:
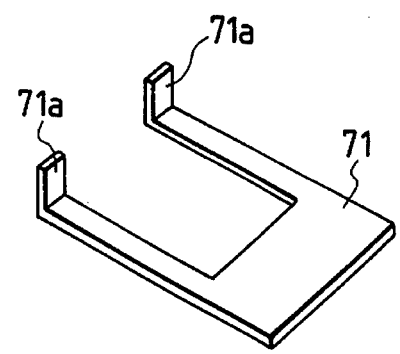
FIG. 6 is a perspective view showing the fourth embodiment.
Figure 7:
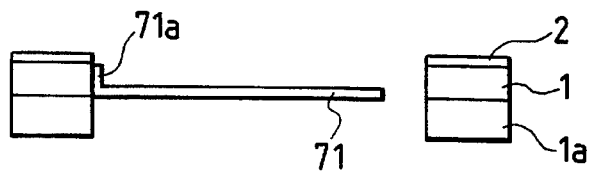
FIG. 7 is a side view of FIG. 6.

FIGS. 6 and 7 show a fourth embodiment of the present invention. FIG. 6 illustrates only the planar auxiliary supporting member 71. In this embodiment, projected portions 71a are formed by bending the distal ends of the supporting member, and are joined to the inner side surface of the elastic member 1, as shown in FIG. 7.

Figure 8:
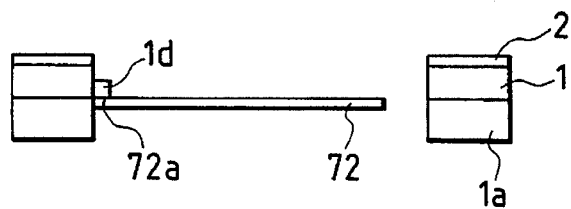
FIG. 8 is a side view showing the fifth embodiment.
Figure 9:
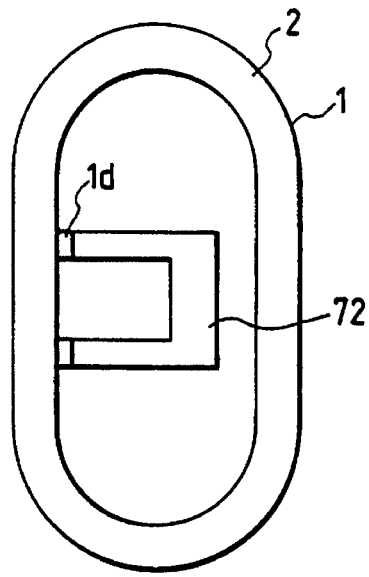
FIG. 9 is a plan view of FIG. 8.

FIGS. 8 and 9 show a fifth embodiment of the present invention. A pair of projected portions 1d are formed on the side surface of an inner circumferential portion of the elastic member 1, and distal end portions 72a of a planar auxiliary supporting member 72 are joined to the projected portions 1d. Note that the projected portions 1d formed on the elastic member 1 are arranged near the neutral surface of the elastic member 1 so as not to disturb the vibration of the elastic member 1.

In the above embodiments of the present invention, the planar auxiliary supporting member 7 has an H shape, and the members 70 (FIG. 4), 71 (FIG. 6), and 72 (FIG. 8) have corresponding shapes. However, the present invention is not limited to these shapes. For example, the supporting member may have an X shape, as disclosed in Japanese Laid-Open Patent Application No. 4-21374.

Also, in the above embodiments, the projection 1a, or the projections 1b and 1c of the elastic member 1 directly contact the rail-shaped stationary member 8. Alternatively, a resin may be adhered, as a sliding member, to the projection 1a of the elastic member 1, or the projections 1b and 1c in FIG. 3 may be formed using a resin. In each of the above embodiments, the elastic member 1 moves along the rail-shaped stationary member 8. Alternatively, the elastic member 1 may be fixed, and a movable member may move along the elastic member.

Figure 10:
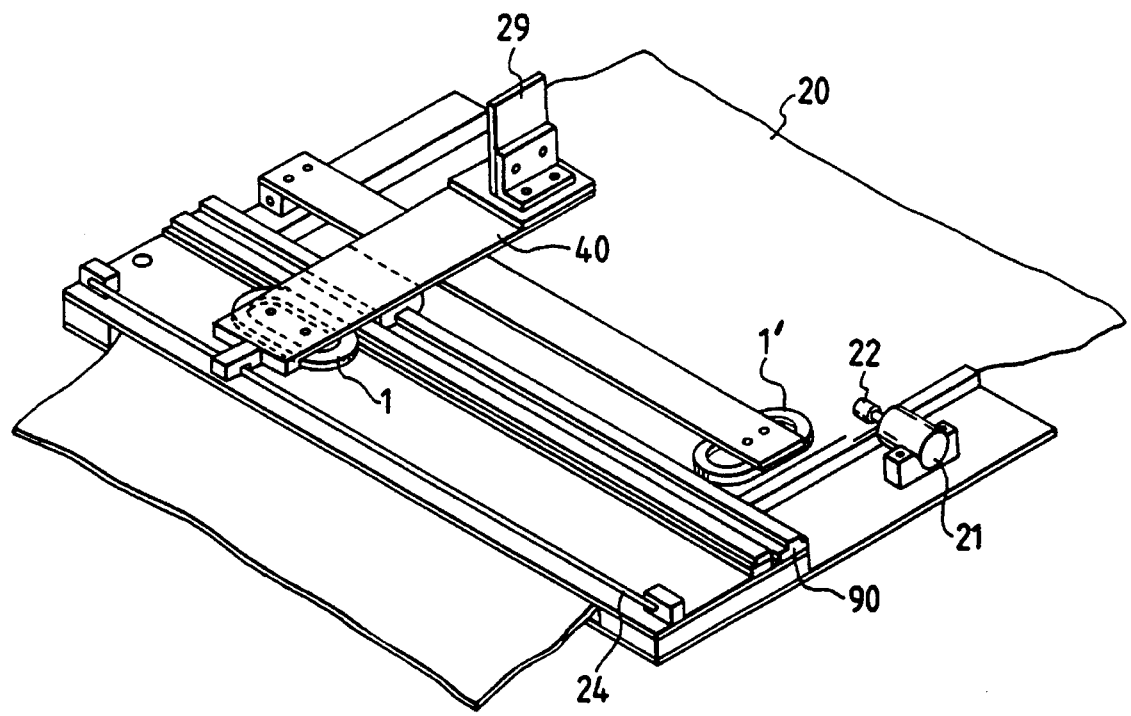
FIG. 10 is a perspective view showing an embodiment of a printer apparatus using a vibration wave motor according to the present invention.
Figure 11:
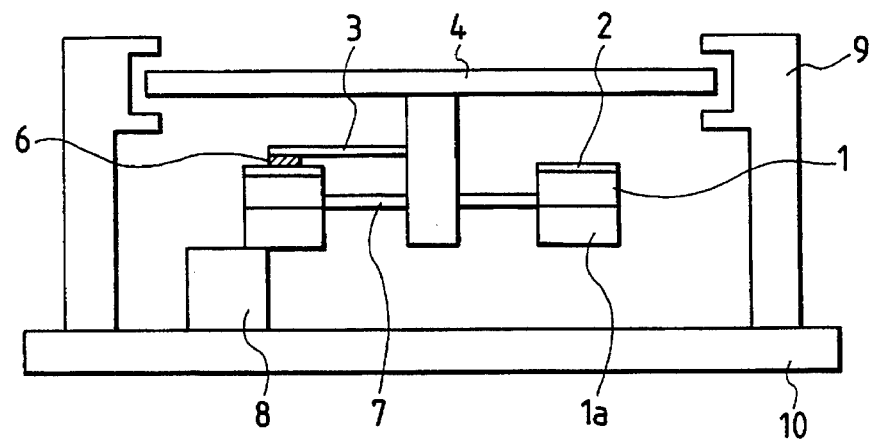
FIG. 11 is a side view of a conventional vibration wave motor.

FIG. 10 is a perspective view of a bubble-jet printer apparatus using the above-mentioned vibration wave motor. A printing head 29 is placed on a carriage 40 to eject an ink, and the ejected ink is printed on a paper sheet 20 fed by a paper feed vibration wave motor 1' (as disclosed in, e.g., Japanese Laid-Open Patent Application No. 3-31137). A slit plate 24 for forming an encoder is arranged to control the feed speed of the carriage, and a rotary encoder 21 for detecting the paper feed amount is rotated by a roller 22 urged against the upper surface of the paper sheet 20.

As described above, according to the present invention, since the auxiliary supporting member has low rigidity, the posture of the elastic member follows the frictional surface of the rail-shaped stationary member. Thus, the contact state between the elastic member and the stationary member can be stabilized, so that the elastic member can stably move.

If the slit bottom surface of the elastic member has good flatness, then the planar auxiliary supporting member is preferably joined to this surface for the purpose of easy manufacture. When the slit bottom surface does not have good flatness, the supporting member may be joined to the side surface of the elastic member, or maybe joined to a projected portion formed on the side surface of the elastic member so as to facilitate a joint process.

When the above-mentioned vibration wave motor is utilized as a drive source for driving, e.g., a printing head, high-precision printing can be realized.

What is claimed is:

1. A vibration driven apparatus, comprising:
   a stationary member having a contact surface; comprising:
   a stationary member having a contact surface;
   a vibration generating member, having a contact surface contactable with the contact surface of said stationary member;
   an elastic supporting member provided on said vibration generating member; and
   a pressing member for biasing said stationary member and said vibration generating member in a press contact state, wherein said vibration generating member moves relative to said stationary member by a vibration of said vibration generating member, and wherein said elastic supporting member includes means for exerting a force on said vibration generating member less than a force the pressing member exerts on the vibration generating member.

2. A vibration driven apparatus according to claim 1, wherein said supporting member is planar.

3. A vibration driven apparatus according to claim 1, wherein said vibration generating member is elliptic.

4. A vibration driven apparatus according to claim 3, wherein said pressing member has a projecting portion, which presses the vibration generating member, so that the vibration generating member is in press contact with the stationary member.

5. A vibration driven apparatus according to claim 3, wherein said pressing member has a projecting portion, which presses a central area of the vibration generating member, so that the vibration generating member is in press contact with the stationary member.

6. A vibration driven printing device, comprising:

a stationary member having a contact surface;

a vibration generating member, having a contact surface contactable with the contact surface of said stationary member;

an elastic supporting member provided on said vibration generating member;

a pressing member for biasing said stationary member and said vibration generating member in a press contact state, wherein said vibration generating member moves relative to said stationary member by a vibration of said vibration generating member; and a printing head movable with a movement of said vibration generating member in an interlocking manner;

wherein said elastic supporting member includes means for exerting a force on said vibration generating member less than a force the pressing member exerts on the vibration generating member.

7. A vibration driven printing device according to claim 6, further comprising:

a guide member for movably holding said printing head.

* * * * *

UNITED STATES PATENT AND TRADEMARK OFFICE
CERTIFICATE OF CORRECTION

PATENT NO. : 5,484,216
DATED : January 16, 1996
INVENTOR(S) : ATSUSHI KIMURA, ET AL.

It is certified that error appears in the above-indentified patent and that said Letters Patent is hereby corrected as shown below:

Title page,
At [56] References Cited

Insert --5,216,314  6/1993  Suzuki
              5,313,132  5/1994  Nakanishi--.

Title page,
At [22] Filed:

"December 1, 1995" should read --December 1, 1993--.

Column 1

Line 34, "81" should read --8--.

Column 2

Line 59, "distribute" should read --distribute the--.

Column 4

Line 28, "maybe should read --may be--.

Signed and Sealed this

Second Day of July, 1996

Attest:

BRUCE LEHMAN

*Attesting Officer*    *Commissioner of Patents and Trademarks*